United States Patent
Okamoto et al.

(10) Patent No.: US 8,053,543 B2
(45) Date of Patent: Nov. 8, 2011

(54) FILLER FOR OPTICAL ISOMER SEPARATION

(75) Inventors: Yoshio Okamoto, Nagoya (JP); Chiyo Yamamoto, Suzuka (JP); Tomoyuki Ikai, Nagoya (JP); Masami Kamigaito, Nagoya (JP)

(73) Assignees: National University Corporation Nagoya University, Nagoya-shi, Aichi (JP); Daicel Chemical Industries, Ltd., Osaka-shi, Osaka (JP)

( * ) Notice: Subject to any disclaimer, the term of this patent is extended or adjusted under 35 U.S.C. 154(b) by 341 days.

(21) Appl. No.: 12/227,151

(22) PCT Filed: May 2, 2007

(86) PCT No.: PCT/JP2007/059372
§ 371 (c)(1),
(2), (4) Date: Dec. 12, 2008

(87) PCT Pub. No.: WO2007/129659
PCT Pub. Date: Nov. 15, 2007

(65) Prior Publication Data
US 2009/0124798 A1    May 14, 2009

(30) Foreign Application Priority Data
May 9, 2006   (JP) ................. 2006-130194

(51) Int. Cl.
C08G 77/00   (2006.01)
C08B 1/00    (2006.01)

(52) U.S. Cl. .......... 528/26; 536/56; 536/102; 536/123.1
(58) Field of Classification Search ............. 528/26; 536/56, 102, 123.1
See application file for complete search history.

(56) References Cited

U.S. PATENT DOCUMENTS
5,811,532 A   9/1998   House

FOREIGN PATENT DOCUMENTS

| | | |
|---|---|---|
| EP | 0 281 951 A1 | 9/1988 |
| EP | 0 401 668 A2 | 12/1990 |
| EP | 0 401 668 A3 | 12/1990 |
| JP | 2002-241317 | 8/2002 |
| JP | 2002-323483 | 11/2002 |
| JP | 2004-163110 | 6/2004 |
| JP | 2005-017268 | 1/2005 |
| JP | 2005-315668 | 11/2005 |
| WO | WO 98/33572 | 8/1998 |
| WO | WO 03/004534 A1 | 1/2003 |
| WO | WO 2004/095018 | 11/2004 |

OTHER PUBLICATIONS

European Patent Office Search Report dated Nov. 19, 2009 (9 pages).
Xiaoming Chen et al., "Synthesis of covalently bonded cellulose derivative chiral stationary phases with a bifunctional reagent of 3-(triethoxysilyl)propyl isocyanate", Journal of Chromatography, vol. 1010, No. 2, Aug. 29, 2003 (pp. 185-194).
Feng Qin, et al., "Improved Procedure for Preparation of Covalently Bonded Cellulose Tris-phenylcarbamate Chiral Stationary Phases", Chinese Journal of Chemistry (2005) 23(7), pp. 885-890.
Separation of the Optical Isomers of Amino Acids by Ligand-Exchange Chromatography Using Chemically Bonded Chiral Phases, by G. Gübitz et al, Journal of Chromatography, vol. 203, 1981, pp. 377-384.
Chiral Resolution of Dipeptides by Ligand Exchange Chromatography on Chemically Bonded Chiral Phases, by G. Gübitz et al, J. Liq. Chrom. & Rel. Technol., vol. 19, No. 17 & 18, 1996, pp. 2933-2942.
Chiral-Bonded Silica Gel Stationary Phases Obtained From Chiral Silanes for High-Performance Liquid Chromatography, by L. Oliveros et al, Journal of Chromatography, vol. 606, 1992, pp. 9-17.

*Primary Examiner* — Ling Choi
*Assistant Examiner* — Chung-Cheng Wang
(74) *Attorney, Agent, or Firm* — Flynn, Thiel, Boutell & Tanis, P.C.

(57) ABSTRACT

A polymer compound derivative, obtained by modifying part of the hydroxy or amino groups of a polymer compound having the hydroxy or amino groups with molecules of a compound represented by the following general formula (I): A-X—Si$(Y)_n R_{3-n}$ (I), where A represents a reactive group which reacts with a hydroxy or amino group, X represents an alkylene group which has 1 to 18 carbon atoms and which may have a branch, or an arylene group which may have a substituent, Y represents a reactive group which reacts with a silanol group to form a siloxane bond, R represents an alkyl group which has 1 to 18 carbon atoms and which may have a branch, or an aryl group which may have a substituent, and n represents an integer of 1 to 3.

7 Claims, 6 Drawing Sheets

1

2

3

4

5

6

7

Co (acac) 3

8

9

10

FILLER FOR OPTICAL ISOMER SEPARATION

TECHNICAL FIELD

The present invention relates to a polymer compound derivative to be used in a filler for optical isomer separation and a method of producing the polymer compound derivative, and, further, a filler for optical isomer separation using the polymer compound derivative.

BACKGROUND ART

Optical resolution by chromatography has conventionally been attracting attention remarkably in various fields including analytical chemistry, organic chemistry, medicine, and pharmacy, and a large number of chiral stationary phases have been reported in the world. In particular, for example, an ester derivative or carbamate derivative obtained by chemically modifying cellulose or amylose as an optically active polymer serves as a chiral stationary phase having a high optical resolution, and a filler for chromatography using this derivative has been known to the public. A filler for chromatography using such a polymer compound derivative is used in a state of being carried by a carrier such as silica gel for the purposes of, for example, increasing the ratio at which a column is filled with the filler, and improving the ease of handling and mechanical strength of the filler.

For example, Patent Document 1 describes a filler for chromatography obtained by causing a carrier such as silica to carry a cellulose derivative containing an aromatic ring. In addition, Patent Document 2 describes a filler for chromatography obtained by causing a carrier such as silica to carry a carbamate derivative of a polysaccharide such as amylose.

However, the above-mentioned conventional fillers for chromatography, each using a polymer compound such as a polysaccharide derivative, are such that the polymer compound merely adsorbs physically to the carrier so as to be carried. Accordingly, in some elution solvents, the polymer compound dissolves in the elution solvents, with the result that each of the fillers becomes unusable in some cases.

In particular, the fractionation of a large amount of optical isomers requires the dissolution of a high concentration of a raw material before separation in an elution solvent. An elution solvent capable of meeting the requirement has been perceived as a problem because the polymer compound such as a polysaccharide derivative generally shows a high solubility in the elution solvent.

In addition, the polymer compound, such as a polysaccharide derivative, has so small a mechanical strength that the following problem arises: particularly when the polymer compound is used for HPLC, the polymer compound cannot withstand a pressure at the time of using HPLC.

In order that those problems may be prevented, attempts have been made to bond the polymer compound such as a polysaccharide derivative chemically to the surface of a carrier to improve the mechanical strength of the polymer compound as well as to prevent the elution of the polymer compound due to an elution solvent.

For example, Patent Document 3 discloses a filler for chromatography obtained by chemically bonding an optically active polymer compound to silica gel.

However, in the above-mentioned filler for chromatography described in Patent Document 3, only a trace amount of the polymer compound chemically bonded to the surface of a carrier such as silica contributes to optical resolution, so the filler is susceptible to improvement so that the filler may achieve an additionally high separation ability.

To overcome the above-mentioned problems, Patent Documents 4 and 5 each describe that a polysaccharide derivative is used as a filler for optical isomer separation in the form of a powder or bead without using a carrier such as silica. However, the invention described in Patent Document 4 is susceptible to improvement in terms of the following: a time period required for production steps for the filler for optical isomer separation should be shortened because a crosslinking reaction within the beads is performed over 14 hours after the polysaccharide derivative has been turned into the beads. In addition, the invention described in Patent Document 5 is susceptible to improvement in terms of mechanical strength because the polysaccharide derivative is merely turned into beads and no crosslinking reaction within the beads is performed.

Non-patent Document 1 discloses a cellulose derivative to be used in the separation of optical isomers, and describes a method involving the use of a silane coupling agent as a spacer for chemically bonding the cellulose derivative onto a silica matrix. However, Non-patent Document 1 does not describe any bead to be used as a filler for optical isomer separation.

Patent Document 1: JP 60-142930 A
Patent Document 2: JP 60-226831 A
Patent Document 3: JP 60-196663 A
Patent Document 4: WO 2004/086029 A1
Patent Document 5: JP 3181349
Non Patent Document 1: J. Chromatogr. A, 1010 (2003)185-194

DISCLOSURE OF THE INVENTION

Problems to be Solved by the Invention

The present invention provides a polymer compound derivative into which a compound having a silyl group is efficiently and controllably introduced, and a filler for optical isomer separation which: is excellent in solvent resistance and abilities to resolve and fractionate optical isomers; and has a controllable mechanical strength. Further, the present invention provides a method of producing a filler for optical isomer separation in which a time period for production steps is shortened.

Means for Solving the Problems

The present invention has been made in view of the above-mentioned circumstances. The inventors of the present invention have made extensive studies and, as a result, have found that a filler for optical isomer separation having excellent abilities to resolve and fractionate optical isomers and, furthermore, solvent resistance can be provided by using a polymer compound derivative obtained by efficiently and controllably introducing a compound having a silyl group into a polymer compound as a raw material for a filler for optical isomer separation, that a time period for the production steps for the filler for optical isomer separation can be shortened by using the polymer compound derivative and, furthermore, that the use of the polymer compound derivative allows one to adjust the mechanical strength of the filler for optical isomer separation.

In the present invention, a polymer compound derivative obtained by modifying part of the hydroxy or amino groups of a polymer compound having the hydroxy or amino groups is used in the separation of optical isomers. The present invention provides a polymer compound derivative obtained by modifying part of the hydroxy or amino groups of the above-mentioned polymer compound having the hydroxy or amino groups with molecules of a compound represented by the following general formula (I):

Chem 1

where A represents a reactive group which reacts with a hydroxy or amino group, X represents an alkylene group which has 1 to 18 carbon atoms and which may have a branch, or an arylene group which may have a substituent, Y represents a reactive group which reacts with a silanol group to form a siloxane bond, R represents an alkyl group which has 1 to 18 carbon atoms and which may have a branch, or an aryl group which may have a substituent, and n represents an integer of 1 to 3.

In addition, the present invention provides a method of producing a polymer compound derivative, including:

a first modifying step of modifying part of the hydroxy or amino groups of a polymer compound having the hydroxy or amino groups, the polymer compound being dissolved, with molecules of a compound, excluding a compound represented by the above-mentioned general formula (I); and a second modifying step of modifying the hydroxy or amino groups of the polymer compound which remain unmodified with the molecules of the compound, excluding the compound represented by the above-mentioned general formula (I) in the first modifying step with molecules of the compound represented by the above-mentioned general formula (I).

In addition, the present invention provides a bead composed of a polymer compound derivative obtained by modifying part of the hydroxy or amino groups of a polymer compound having the hydroxy or amino groups with molecules of a compound represented by the above general formula (I).

In addition, the present invention provides a method of producing beads, including the steps of: dissolving the polymer compound derivative obtained by modifying part of the hydroxy or amino groups of a polymer compound having the hydroxy or amino groups with molecules of a compound represented by the above-mentioned general formula (I) in an organic solvent to prepare a polymer compound derivative solution; and dropping the polymer compound derivative solution into an aqueous solution of a surfactant or a proton-donating solvent while stirring the aqueous solution or the solvent.

Further, the present invention provides a filler for optical isomer separation containing the polymer compound derivative obtained by modifying part of the hydroxy or amino groups of a polymer compound having the hydroxy or amino groups with molecules of a compound represented by the above-mentioned general formula (I).

Effects of the Invention

The polymer compound derivative modified with the compound represented by the above-mentioned general formula (I) according to the present invention is an extremely useful functional material, and is effective particularly for the separation of optical isomers.

The method of producing the above-mentioned polymer compound derivative of the present invention is excellent in productivity because the hydroxy or amino groups of the polymer compound having the hydroxy or amino groups can be efficiently and controllably modified with the molecules of the compound represented by the above-mentioned general formula (I).

Further, an optical isomer separation column filled with crosslinked beads prepared from the polymer compound derivative of the present invention is excellent in optical resolution.

In addition, an optical isomer separation column filled with the beads of the present invention is excellent in ability to fractionate optical isomers.

In addition, the beads according to the present invention are excellent in solvent resistance because a crosslinking reaction within the beads is prompted through a siloxane bond.

In the present invention, a time period for the production steps for the filler for optical isomer separation can be shortened because the operation of turning the above-mentioned polymer compound derivative into beads and a crosslinking reaction within the beads are prompted simultaneously.

In addition, the mechanical strength of the above-mentioned beads can be changed by changing the amount in which the compound represented by the above-mentioned general formula (I) is introduced.

BEST MODE FOR CARRYING OUT THE INVENTION

Figure 1:
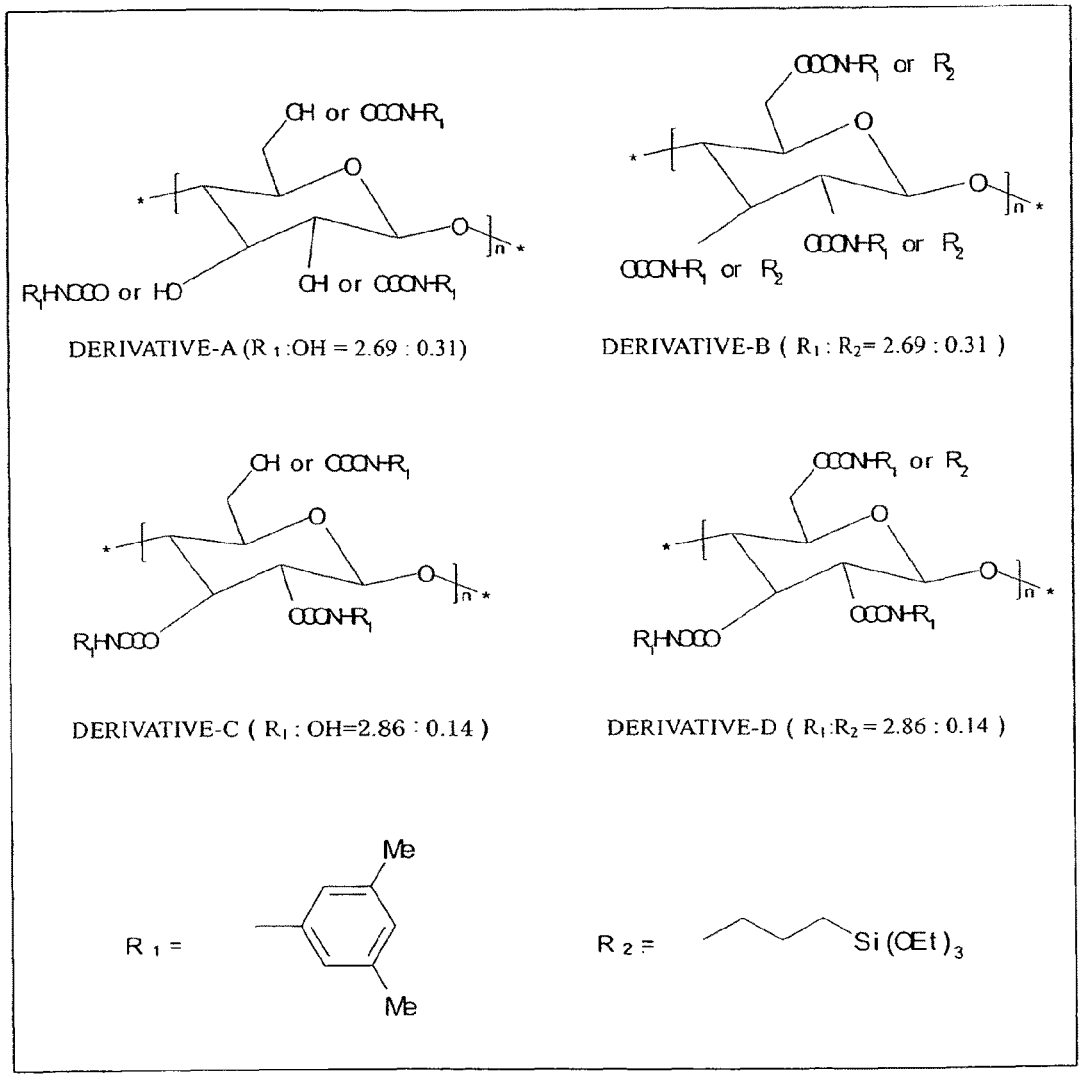
FIG. 1 is a view showing the structure of a polymer compound derivative (cellulose derivative) obtained in each of Examples 1 and 2.

Hereinafter, the present invention will be described.
<1> Polymer Compound Derivative of the Present Invention A polymer compound derivative of the present invention can be used not only in the production of beads to be used in the separation of optical isomers but also in the production of a filler for optical isomer separation to be used in the production of a separation column for gas chromatography, capillary chromatography, or the like.

The polymer compound derivative of the present invention is characterized by being obtained by modifying part of the hydroxy or amino groups of a polymer compound having the hydroxy or amino groups with molecules of a compound represented by the following general formula (I):

Chem 2

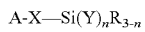

where A represents a reactive group which reacts with a hydroxy or amino group, X represents an alkylene group which has 1 to 18 carbon atoms and which may have a branch, or an arylene group which may have a substituent, Y represents a reactive group which reacts with a silanol group to form a siloxane bond, R represents an alkyl group which has 1 to 18 carbon atoms and which may have a branch, or an aryl group which may have a substituent, and n represents an integer of 1 to 3.

The above-mentioned polymer compound to be used in the production of the polymer compound derivative of the present invention is preferably an optically active organic polymer compound, or more preferably a polysaccharide. Any one of the natural polysaccharides, synthetic polysaccharides, and natural product-denatured polysaccharides can be preferably used as the polysaccharide to be used in the present invention as long as the polysaccharide to be used has chirality. Of those, a polysaccharide in which monosaccharides are regularly bonded to each other is suitable because the polysaccharide can additionally improve the ability of a filler containing the polymer compound derivative to separate optical isomers.

Specific examples of the polysaccharide include β-1,4-glucan (cellulose), α-1,4-glucan (amylose, amylopectin), α-1,6-glucan (dextran), β-1,6-glucan (pustulan), β-1,3-glucan (curdlan, schizophyllan), α-1,3-glucan, β-1,2-glucan (Crown Gall polysaccharide), β-1,4-galactan, β-1,4-mannan, α-1,6-mannan, β-1,2-fructan (inulin), β-2,6-fructan (levan), β-1,4-xylan, β-1,3-xylan, β-1,4-chitosan, β-1,4-N-acetylchitosan (chitin), pullulan, agarose, alginic acid, α-cyclodextrin, β-cyclodextrin, and γ-cyclodextrin. Starch-containing amylose is also included.

Of those, preferred are cellulose, amylose, β-1,4-chitosan, chitin, β-1,4-mannan, β-1,4-xylan, inulin, curdlan, and the like, with which high-purity polysaccharides can be easily obtained, and cellulose and amylose are more preferred.

The polysaccharide has a number average degree of polymerization (average number of pyranose or furanose rings in one molecule of the polysaccharide) of preferably 5 or more, or more preferably 10 or more, and there is no particular upper limit for the number average degree of polymerization; the number average degree of polymerization is preferably 1,000 or less in terms of the ease of handling of the polysaccharide, and is more preferably 5 to 1,000, still more preferably 10 to 1,000, or particularly preferably 10 to 500.

In the present invention, the polymer compound derivative means a polymer compound obtained by modifying part of the hydroxy or amino groups of a polymer compound having the hydroxy or amino groups. When the polymer compound to be used as a raw material for the production of the polymer compound derivative is a polysaccharide, the above-mentioned polymer compound derivative is a polysaccharide derivative.

In the above-mentioned general formula (I), A represents a reactive group which reacts with a hydroxy or amino group, or preferably represents, for example, a chlorocarbonyl group, a carboxyl group, an isocyanate group, a glycidyl group, or a thiocyanate group, X represents an alkylene group which has 1 to 18 carbon atoms and which may have a branch or which may have a heteroatom introduced into itself, or an arylene group which may have a substituent, preferably represents an alkylene group which has 1 to 18 carbon atoms and which may have a branch, or particularly preferably represents, for example, an ethylene group, a propylene group, or a butylene group, Y represents a reactive group which reacts with a silanol group to form a siloxane bond, preferably represents, for example, an alkoxy group having 1 to 12 carbon atoms or a halogen group, or particularly preferably represents, for example, a methoxy group, an ethoxy group, or a propoxy group, and n represents an integer of 1 to 3.

Examples of the compound represented by the above-mentioned general formula (I) include 3-isocyanate propyl triethoxysilane, 3-isocyanate propyl trimethoxysilane, 3-isocyanate propyl diethoxymethylsilane, 2-isocyanate ethyl triethoxysilane, 4-isocyanate phenyl triethoxysilane, 3-glycidoxy propyl trimethoxysilane, 3-glycidoxy propyl triethoxysilane, and 3-thiocyanate propyl triethoxysilane. Preferred are 3-isocyanate propyl triethoxysilane and 3-isocyanate propyl trimethoxysilane.

In the above-mentioned polymer compound derivative, molecules of the compound represented by the above-mentioned general formula (I) are introduced into part of the hydroxy or amino groups of the above-mentioned polymer compound having the hydroxy or amino groups.

The positions at which the molecules of the compound represented by the above-mentioned general formula (I) are introduced into the hydroxy or amino groups of the above-mentioned polymer compound having the hydroxy or amino groups are not particularly limited.

In addition, the above-mentioned term "part" can be represented as a ratio of introduction of the molecules of the compound represented by the above-mentioned general formula (I) into the hydroxy or amino groups of the polymer compound having the hydroxy or amino groups. The ratio of introduction is preferably 1.0 to 35%, more preferably 1.5 to 20%, or particularly preferably 2.0 to 10%. The reason why a ratio of introduction of the molecules of the compound represented by the above-mentioned general formula (I) of less than 1.0% or in excess of 35% is not preferable is as follows: when the ratio is less than 1.0%, the yield in which each of the polymer compound derivative and a bead composed of the polymer compound derivative is produced reduces while, when the ratio exceeds 35%, the optical resolution of a filler containing the polymer compound derivative reduces.

In addition, the above-mentioned ratio of introduction (%) is defined as follows: when the polymer compound to be used in the production of the polymer compound derivative of the present invention has only hydroxy groups, the ratio of introduction is a numerical value obtained by multiplying a ratio of the number of hydroxy groups modified with the molecules of the compound represented by the above-mentioned general formula (I) to the total number of the hydroxy groups of the polymer compound by 100; when the above-mentioned polymer compound has only amino groups, the ratio of introduction is a numerical value obtained by multiplying a ratio of the number of amino groups modified with the molecules of the compound represented by the above-mentioned general formula (I) to the total number of the amino groups by 100; or when the above-mentioned polymer compound has hydroxy groups and amino groups, the ratio of introduction is a numerical value obtained by multiplying a ratio of the sum of the numbers of hydroxy groups and amino groups modified with the molecules of the compound with which the hydroxy or amino groups are modified to the sum of the total number of the hydroxy groups and the total number of the amino groups by 100. In addition, in the present invention, the same definition as that described above is applicable also to the ratio of introduction of molecules of a compound except the compound represented by the above-mentioned general formula (I).

In the above-mentioned polymer compound derivative, at least part of the hydroxy or amino groups, except for the hydroxy or amino groups modified with the molecules of the compound represented by the above-mentioned general formula (I), are preferably further modified with molecules of a compound having a functional group which acts on an optical isomer.

The above-mentioned functional group is a functional group, which acts on an optical isomer in a sample containing optical isomers to be separated. The action of the functional group on the optical isomer cannot be uniquely defined because the kind of functional group varies depending on the kind of optical isomers to be separated; the action is not particularly limited as long as the action suffices for the optical resolution of the above-mentioned optical isomers with the above-mentioned polymer compound derivative. Examples of the above-mentioned functional group include a group containing an aromatic group, which may have a substituent, and an aliphatic group having a cyclic structure. The above-mentioned aromatic group can contain a heterocyclic ring or a condensed ring. Examples of the substituent, which the above-mentioned aromatic group may have, include an alkyl group having up to about 8 carbon atoms, a halogen group, an amino group, and an alkoxyl group. The above-mentioned functional group is selected in accordance with the kind of the above-mentioned optical isomers to be separated.

In addition, the molecules of the compound having the functional group which acts on an optical isomer are preferably introduced into the at least part of the hydroxy or amino groups, except for the hydroxy or amino groups modified with the molecules of the compound represented by the above-mentioned general formula (I), through a urethane bond, an ester bond, or an ether bond for a hydroxy group and a urea bond or an amide bond for an amino group; a urethane bond and a urea bond are particularly preferable for a hydroxy group and an amino group, respectively. Therefore, the above-mentioned compound having the functional group, which acts on an optical isomer, is a compound having a functional group, which can react with a hydroxy or amino group of the above-mentioned polymer compound as well. The above-mentioned compound having a functional group which can react with a hydroxy or amino group may be an arbitrary compound as long as the compound is an isocyanic acid derivative, a carboxylic acid, an acid halide, an alcohol, or any other compound having reactivity with a hydroxy or amino group.

It should be noted that neither the ratio of introduction of the molecules of the compound having the above-mentioned functional group nor the positions at which the molecules of the compound are introduced in the polymer compound are particularly limited, and the ratio and the positions are appropriately selected in accordance with, for example, the kind of functional group and the kind of polymer compound.

The above-mentioned compound having a functional group which acts on an optical isomer is particularly preferably a compound containing an atomic group represented by the following general formula (II) or (III):

Chem 3

(II)

(III)

where R' represents an aliphatic or aromatic hydrocarbon group which may contain a heteroatom, and the aliphatic or aromatic hydrocarbon group may be unsubstituted or may be substituted with one or more groups selected from the group consisting of a hydrocarbon group which has 1 to 12 carbon atoms and which may contain a heteroatom, a cyano group, a halogen group, a hydroxy group, a nitro group, an amino group, and a dialkylamino group containing two alkyl groups each having 1 to 8 carbon atoms.

Examples of the monovalent aromatic hydrocarbon group represented by R' described above include a phenyl, naphthyl, phenanthryl, anthracyl, indenyl, indanyl, furyl, thionyl, pyryl, benzofuryl, benzthionyl, indyl, pyridyl, pyrimidyl, quinolinyl, and isoquinolinyl group. In addition, examples of the substituent for the monovalent aromatic hydrocarbon group represented by R' include alkyl groups having from 1 to 12 carbon atoms, alkoxy groups having from 1 to 12 carbon atoms, alkylthio groups having from 1 to 12 carbon atoms, a cyano group, halogen groups, acyl groups having from 1 to 8 carbon atoms, acyloxy groups having from 1 to 8 carbon atoms, a hydroxy group, alkoxycarbonyl groups having from 1 to 12 carbon atoms, a nitro group, amino groups, and dialkylamino group containing two alkyl groups, each having from 1 to 8 carbon atoms. In addition, as the aliphatic hydrocarbon group represented by R' described above, desired is an alicyclic compound, the ring of which contains more than 3 members, or more preferably, more than 5 members, or an alicyclic compound having a cross-linked structure. Of those, preferred is a cyclohexyl, cyclopentyl, norbornyl, cycloadamantyl pentyl group, or the like.

In the present invention, part of the hydroxy or amino groups, except for the hydroxy or amino groups modified with the molecules of the compound represented by the above-mentioned general formula (I), is preferably modified with molecules of one or more kinds of compounds selected from the group consisting of phenyl isocyanate, tolyl isocyanate, naphthylethyl isocyanate, 3,5-dimethylphenyl isocyanate, 3,5-dichlorophenyl isocyanate, 4-chlorophenyl isocyanate, 3,5-dinitrophenyl isocyanate, and 1-phenylethyl isocyanate. Those groups are particularly preferably modified with molecules of 3,5-dimethylphenyl isocyanate.

In the polymer compound derivative of the present invention, the sum of the ratio of introduction of the molecules of the compound represented by the above-mentioned general formula (I) and the ratio of introduction of the molecules of the compound having the above-mentioned functional group is preferably 90 to 100%, more preferably 97 to 100%, or particularly preferably 100%.

<2> Method of Producing the Polymer Compound Derivative of the Present Invention The polymer compound derivative of the present invention can be produced as described below. That is, a first method of producing the polymer compound derivative of the present invention includes at least:

a first modifying step of modifying part of the hydroxy or amino groups of a polymer compound having the hydroxy or amino groups, the polymer compound being dissolved, with molecules of a compound except a compound represented by the above-mentioned general formula (I); and a second modifying step of modifying hydroxy or amino groups of the above-mentioned polymer compound which are not modified with the molecules of the compound except the compound represented by the above-mentioned general formula (I) in the above-mentioned first modifying step with molecules of the compound represented by the above-mentioned general formula (I).

The above-mentioned first modifying step is preferably performed before the above-mentioned second modifying step in order that the compound represented by the above-mentioned general formula (I) may be efficiently and controllably introduced into the above-mentioned polymer compound.

It should be noted that the above-mentioned production method may further include a step of dissolving the polymer compound in order that a dissolved polymer compound having hydroxy or amino groups may be obtained. In the above-mentioned dissolving step, a known method can be employed for dissolving the polymer compound; when the polymer compound to be dissolved is hardly soluble in a solvent or the like, the method preferably includes a step of swelling the polymer compound. In addition, when a dissolved polymer compound having hydroxy or amino groups is commercially available, it is possible to purchase and use the dissolved polymer compound.

As a solvent which swells the polymer compound in the above-mentioned swelling step, an amide-based solvent is preferably used. Examples of the solvent include a mixed solution such as a mixed solution of N,N-dimethyl acetamide and lithium chloride, N-methyl-2-pyrrolidone and lithium chloride, or 1,3-dimethyl-2-imidazolidinone and lithium chloride. A mixture solution of N,N-dimethyl acetamide and lithium chloride is particularly preferably used.

The above-mentioned dissolving step is preferably performed under a nitrogen atmosphere. In addition, when the above-mentioned polymer compound is a polysaccharide, the polysaccharide is dissolved under, for example, conditions including a temperature of 20 to 100° C. and a time period of 1 to 24 hours; one skilled in the art can appropriately adjust the conditions depending on the polymer compound to be used.

The above-mentioned first modifying step is a step of modifying part of the hydroxy or amino groups of the polymer compound having the hydroxy or amino groups, the polymer compound being dissolved, with molecules of a compound having at least a functional group which acts on an optical isomer and a functional group which can react with a hydroxy or amino group. A known method can be employed in the modification. The hydroxy or amino groups of the polymer compound are particularly preferably modified with the molecules of the compound having a functional group which acts on an optical isomer in an amount corresponding to 60 to 100 mol % of the hydroxy or amino groups of the polymer compound in a mixed solution of dimethylacetamide, lithium chloride, and pyridine at 80 to 100° C. for 1 to 24 hours under a nitrogen atmosphere in order that the ratio of introduction of the molecules of the compound having the functional group may be controlled. In particular, the reaction temperature, the reaction time, and the amount in which the compound having a functional group which acts on an optical isomer is added each play an important role in adjusting the ratio of introduction of the molecules of the compound having the above-mentioned functional group.

It should be noted that the positions at which the molecules of the compound having at least a functional group which acts on an optical isomer and a functional group which can react with a hydroxy or amino group are introduced in the polymer compound derivative in the present invention are not particularly limited.

The above-mentioned second modifying step is a step of modifying the hydroxy or amino groups of the polymer compound the hydroxy or amino groups of which are not completely modified with the molecules of the compound having at least a functional group which acts on an optical isomer and a functional group which can react with a hydroxy or amino group in the above-mentioned first modifying step with the molecules of the compound represented by the above-mentioned general formula (I). A known method can be employed in the modification. The hydroxy or amino groups before modification of the polymer compound are particularly preferably modified with the molecules of the compound represented by the above-mentioned general formula (I) in an amount corresponding to 1 to 10 mol % of the hydroxy or amino groups before modification of the polymer compound in a mixed solvent of dimethylacetamide, lithium chloride, and pyridine at 80 to 100° C. for 1 to 24 hours under a nitrogen atmosphere in order that the ratio of introduction of the molecules of the compound represented by the above-mentioned general formula (I) may be controlled. Of those conditions, the amount in which the compound represented by the above-mentioned general formula (I) is added plays a particularly important role in controlling the ratio of introduction of the molecules of the compound represented by the above-mentioned general formula (I).

It should be noted that the positions at which the molecules of the compound represented by the above-mentioned general formula (I) are introduced in the polymer compound derivative in the present invention are not particularly limited. When unreacted hydroxy or amino groups are present at the time of the completion of the above-mentioned second modifying step, they are caused to react with the molecules of the compound having the functional groups used in the first modifying step.

In addition, a method of producing the polymer compound derivative to be used in the present invention may be a method including at least: a protective group-introducing step of introducing a protective group into each of part of the hydroxy or amino groups of the polymer compound having the hydroxy or amino groups, the polymer compound being dissolved; a first modifying step of modifying the hydroxy or amino groups remaining in the polymer compound into which the protective group has been introduced with molecules of a compound except the compound represented by the above-mentioned general formula (I); an eliminating step of eliminating the introduced protective group to regenerate hydroxy groups; and a second modifying step of modifying the regenerated hydroxy groups with the molecules of the compound represented by the above-mentioned general formula (I). In the above-mentioned production method including the protective group-introducing step and the eliminating step, the hydroxy or amino groups at specific positions of the polymer compound can be modified with the molecules of the compound represented by the above-mentioned general formula (I).

In the above-mentioned production method including the protective group-introducing step and the eliminating step, the protective group to be introduced in the protective group-introducing step is not particularly limited as long as the group can be eliminated from a hydroxy or amino group more easily than a compound with which a hydroxy or amino group is modified in each modifying step is. A compound for introducing the protective group can be determined on the basis of the reactivity of a hydroxy or amino group to be protected or modified and the reactivity of the compound with a hydroxy or amino group. The compound is, for example, a compound having a triphenylmethyl group (trityl group), a diphenylmethyl group, a tosyl group, a mesyl group, a trimethylsilyl group, or a dimethyl(t-butyl)silyl group, and a compound having a trityl group or a trimethylsilyl group is suitably used.

The introduction of the protective group into a hydroxy or amino group, and the modification of a hydroxy or amino group with a modifying compound can each be performed by a known proper reaction in accordance with the kind of compound to be caused to react with a hydroxy or amino group. In addition, the elimination of the protective group from a hydroxy or amino group in the eliminating step can be performed by a known method such as hydrolysis with an acid or alkali without any particular limitation.

According to the above-mentioned first production method, there is no need to take the trouble to introduce a protective group, so the number of steps can be reduced. As a result, a reduction in cost for the production of the polymer compound derivative can be achieved. In addition, according to the above-mentioned second production step, a molecule of the compound represented by the above-mentioned general formula (I) can be introduced into a hydroxy group at a predetermined position of the polymer compound with reliability.

It should be noted that the employment of the above-mentioned first production method of the present invention allows a predetermined amount of the hydroxy or amino groups of the polymer compound derivative not modified with the molecules of the compound except the compound represented by the above-mentioned general formula (I) in the first modifying step to be modified with the molecules of the compound represented by the above-mentioned general formula (I) in the second modifying step. Therefore, the ratio of introduction of the molecules of the compound represented by the above-mentioned formula (I) into the polymer compound having hydroxy or amino groups can be controlled by adjusting the amount of the compound represented by the above-mentioned general formula (I) in the second modifying step.

When the ratio of introduction of the molecules of the compound represented by the above-mentioned general formula (I) in the polymer compound derivative of the present invention is determined, each of the following two methods involving the use of $^1$H NMR is preferably employed. When a reaction between the compound represented by the above-mentioned general formula (I) and a hydroxy or amino group is complete, the ratios of introduction of the molecules of the compound represented by the above-mentioned general formula (I) determined by the respective methods show an identical value. In the present invention, the following method (2) was employed.

(1) The ratio of introduction of the molecules of a compound except the compound represented by the above-mentioned general formula (I) in the polymer compound derivative is determined from an elemental analysis value for the polymer compound derivative before the introduction of the compound represented by the above-mentioned general formula (I). After that, the ratio of introduction of silyl groups in the polymer compound derivative into which the compound represented by the above-mentioned general formula (I) has been introduced is calculated from a ratio of the polymer compound derivative between a proton of a functional group of the compound except the compound represented by the above-mentioned general formula (I) and a proton of a functional group directly bonded to silicon of the compound represented by the above-mentioned general formula (I), and the calculated value is defined as the ratio of introduction of the molecules of the compound represented by the above-mentioned general formula (I) in the polymer compound derivative.

(2) After the completion of the modifying steps, a ratio between a proton of a functional group of the compound except the compound represented by the above-mentioned general formula (I) and a proton of a functional group directly bonded to silicon of the compound represented by the above-mentioned general formula (I) is determined on the assumption that the hydroxy or amino groups of the polymer compound derivative of the present invention are completely modified with modifying groups. Then, the ratio of introduction of the molecules of the compound represented by the above-mentioned general formula (I) in the polymer compound derivative is calculated.

Here, Non-patent Document 1 describes a filler for optical isomer separation using a polysaccharide derivative using 3-(triethoxysilyl)propyl isocyanate as a raw material. The polysaccharide derivative is produced by a method involving: dissolving cellulose, a compound containing a modifying group, and 3-(triethoxysilyl)propyl isocyanate in pyridine; and subjecting the solution to a reaction at 90° C. for 10 hours. In the polysaccharide derivative, 3-(triethoxysilyl)propyl isocyanate is used as a spacer for bonding between the polysaccharide derivative and silica. Then, the document describes that, according to the results of the experiment involving the use of $^1$H NMR, a signal derived from propyltriethoxysilane in the polysaccharide derivative is extremely small.

It has been generally known that the reactivity of an isocyanate having a phenyl group is much higher than that of an isocyanate free of any phenyl group. In the above-mentioned production method described in Non-patent Document 1, a reaction between a hydroxy group of a polysaccharide and an isocyanate having a phenyl group probably took priority over any other reaction because both of 3-(triethoxysilyl)propyl isocyanate and phenyl isocyanate were simultaneously caused to react with the hydroxy group. Probably owing to the foregoing, in the above-mentioned results of the experiment involving the use of $^1$H NMR, a signal derived from propyltriethoxysilane in a polysaccharide derivative became extremely small, and hence nearly no propyltriethoxysilane was introduced into the polysaccharide derivative.

Further, the fact that cellulose used as a raw material was not uniformly dissolved in a solvent in the method described in Non-patent Document 1 is also probably responsible for the fact that nearly no propyltriethoxysilane was introduced into the cellulose derivative.

<3> Beads of the Present Invention

The present invention provides beads composed of the above-mentioned polymer compound derivative. The beads in the present invention are nearly spherical particles or spherical particles, and their shapes have the following characteristic: when the longest diameter and shortest diameter of each of, for example, about twenty particles are measured, the average longest diameter-to-shortest diameter ratio of the particles is 1.0 to 5.0, preferably 1.0 to 2.0, or more preferably 1.0 to 1.3. In the present invention, the particle shapes and particle sizes of the beads can be determined from an image photographed with, for example, a scanning electron microscope (SEM).

The above-mentioned beads according to the present invention are obtained by a method involving: gradually adding a polymer compound derivative such as a polysaccharide derivative modified with the compound represented by the above-mentioned general formula (I), the polymer compound derivative being dissolved in an organic solvent, to an aqueous solution of a surfactant or a solvent containing a proton-donating solvent, such as methanol, the aqueous solution or the solvent being sufficiently stirred, to prompt a crosslinking reaction between the molecules of the polymer compound derivative; and isolating an insoluble portion. The organic solvent to be used here may be an arbitrary solvent as long as the polymer compound derivative such as a polysaccharide derivative, is soluble in the solvent; the solvent is particularly preferably hydrophobic. Alternatively, even when the solvent is hydrophilic, the solvent can be mixed with a hydrophobic solvent before use. Instead of the method described above, the beads according to the present invention can be obtained also by a method involving: dissolving the polymer compound derivative modified with a compound other than the compound represented by the above-mentioned general formula (I) and an alkoxysilane, such as tetraethoxysilane or triethoxymethylsilane, in an organic solvent; gradually adding the solution to an aqueous solution of a surfactant or a solvent containing a proton-donating solvent such as methanol, the aqueous solution or the solvent being sufficiently stirred; and isolating an insoluble portion.

The beads in the present invention each have a particle size of typically 1 to 500 μm, preferably 5 to 300 μm, or particularly preferably 5 to 100 μm. As long as the particle size falls within this range, the ratio at which a column or the like is filled with the beads can be increased, and hence the ability of the resultant product to separate optical isomers can be improved. In addition, the beads in the present application are porous and have an average pore size of 10 to 10,000 Å, or preferably 50 to 5,000 Å. An average pore size within such range is preferable because a solution containing optical isomers sufficiently permeates into the pores and the ability of the beads to separate the optical isomers can be improved.

The particle sizes of the beads obtained by the above-mentioned method can be adjusted by adopting the following procedure in the above-mentioned method: the speed at which the aqueous solution of the surfactant or the solvent containing the proton-donating solvent is stirred is set to fall within the range of 800 to 3,000 rpm, or preferably 1,000 to 1,500 rpm, and a ratio between the amounts of the organic solvent and the aqueous solution of the surfactant or the solvent containing the proton-donating solvent, the concentration of the polymer compound derivative, such as a polysaccharide derivative, the speed at which the organic solvent is added to the aqueous solution of the surfactant or the solvent containing the proton-donating solvent, and the shapes of a stirring container and a stirring blade are changed.

The beads of the present invention can be used as a filler for optical isomer separation not only for HPLC but also for chromatography where high pressure resistance is needed such as supercritical fluid chromatography. The beads each using the polymer compound derivative such as a polysaccharide derivative of the present invention each show improved solvent resistance because a crosslinking reaction within the beads occurs through a siloxane bond at the time of the formation of the beads. An optical isomer separation column filled with the beads as a filler for optical isomer separation by a known method can optically resolve an increased amount of optical isomers in one stroke because the column does not use any carrier, and is composed of the beads directly contributing to the separation of the optical isomers. As a result, the optical isomer separation column is excellent in its ability to fractionate the optical isomers. In addition, the optical isomer separation column using the beads of the present invention as a filler for optical isomer separation is excellent in optical resolution because a crosslinking reaction within the beads according to the present invention occurs through a siloxane bond and the production of a reactive group which causes a reduction in optical resolution of the column is suppressed. Further, the reduction in optical resolution can be additionally suppressed by transforming an unreacted alkoxy group in the compound represented by the above-mentioned general formula (I) introduced into the polymer compound derivative into a trialkylsiloxy group with a silane coupling agent, such as chlorotrimethylsilane or chlorotriethylsilane, after the preparation of the beads.

In addition, as described above, the crosslinking reaction within the beads occurs simultaneously with the formation of the beads, so there is no need to prompt the crosslinking reaction after the formation of the beads, and a time period for production steps for the filler for optical isomer separation is significantly shortened. In case of necessity, the solvent resistance and mechanical strength of each of the beads can be additionally improved by properly treating the beads with an acid or the like after the preparation of the beads to promote a crosslinking reaction between unreacted Y's in the compound represented by the above-mentioned general formula (I) introduced into the polymer compound derivative.

Further, the mechanical strength of each of the above-mentioned beads can be adjusted by adjusting the ratio of introduction of the molecules of the compound represented by the above-mentioned general formula (I) in the polymer compound derivative of the present invention or by adding an alkoxysilane such as tetraethoxysilane or triethoxymethylsilane at the time of the formation of the beads. As a result, the beads are applicable not only to a filler for optical isomer separation for HPLC but also to an application where high pressure resistance is needed, such as supercritical fluid chromatography.

<4> Filler for Optical Isomer Separation Containing the Polymer Compound Derivative of the Present Invention The polymer compound derivative, such as a polysaccharide derivative, of the present invention can be used not only in the production of beads as a filler for optical isomer separation obtained through the above-mentioned operations but also in the production of a filler for optical isomer separation produced by a known method using, for example, any other known carrier.

For example, a column for optical isomer separation can be filled with the polymer compound derivative by the following method involving causing a carrier to carry the polymer compound derivative.

The term "carry" as used herein refers to a state where the polymer compound derivative, such as a polysaccharide derivative, is immobilized on the carrier, and a method for the immobilization may be any one of the methods including physical adsorption between the polysaccharide derivative and the carrier, chemical bonding between the polymer compound derivative and the carrier, chemical bonding between molecules of the polymer compound derivative, such as a polysaccharide derivative, chemical bonding between the polymer compound derivative and a third component, the irradiation of the polymer compound derivative, such as a polysaccharide derivative with light, and a radical reaction. Further, the carrier used here is, for example, a porous organic carrier or a porous inorganic carrier, and is preferably a porous inorganic carrier. For example, silica gel is particularly preferably used as the carrier, and its surface is preferably treated so that the influence of any remaining silanol may be eliminated; no problem arises even when the surface is not treated at all.

The filler for optical isomer separation using the polymer compound derivative of the present invention can be used also as a filler for a capillary column for gas chromatography or electrophoresis or, particularly, capillary electrochromatography (CEC), capillary zone electrophoresis (CZE), or micellar electrokinetic chromatography (MEKC).

Hereinafter, examples embodying the present invention will be described. However, the present invention is not limited to these examples.

EXAMPLES

Example 1

(1-1) Synthesis of Cellulose 3,5-dimethylphenylcarbamate Part of Hydroxy Groups of which Remain 300 ml of dehydrated N,N-dimethylacetamide and 25.0 g of lithium chloride were added to 10.0 g (61.8 mmol) of dried cellulose, and the mixture was swollen. After that, the resultant mixture was stirred so that the cellulose was uniformly dissolved. 150 ml of pyridine and 29.4 g (200 mmol) of 3,5-dimethylphenyl isocyanate were added to the resultant dissolved product, and the mixture was subjected to a reaction at 90° C. for 26 hours. The reaction solution was dropped into methanol and recovered as insoluble matter. After that, the recovered matter was dried in a vacuum, whereby 27.9 g of a partially modified cellulose 3,5-dimethylphenylcarbamate derivative-A was obtained. The following analysis confirmed that the ratio of introduction of molecules of 3,5-dimethylphenyl isocyanate was 89.0%.

(1-2) Synthesis of Cellulose 3,5-dimethylphenylcarbamate Having Alkoxysilyl Groups 30 ml of pyridine and 1.34 g (5.42 mmol) of 3-isocyanatepropyltriethoxysilane were added to 2.00 g (3.59 mmol) of the dried derivative-A, and the mixture was subjected to a reaction at 80° C. for 72 hours.

The pyridine soluble portion was dropped into methanol and was recovered as an insoluble portion. After that, the recovered portion was dried in a vacuum, whereby 2.04 g of a cellulose 3,5-dimethylphenylcarbamate derivative-B into which alkoxysilyl groups had been introduced were obtained.

Figure 4:
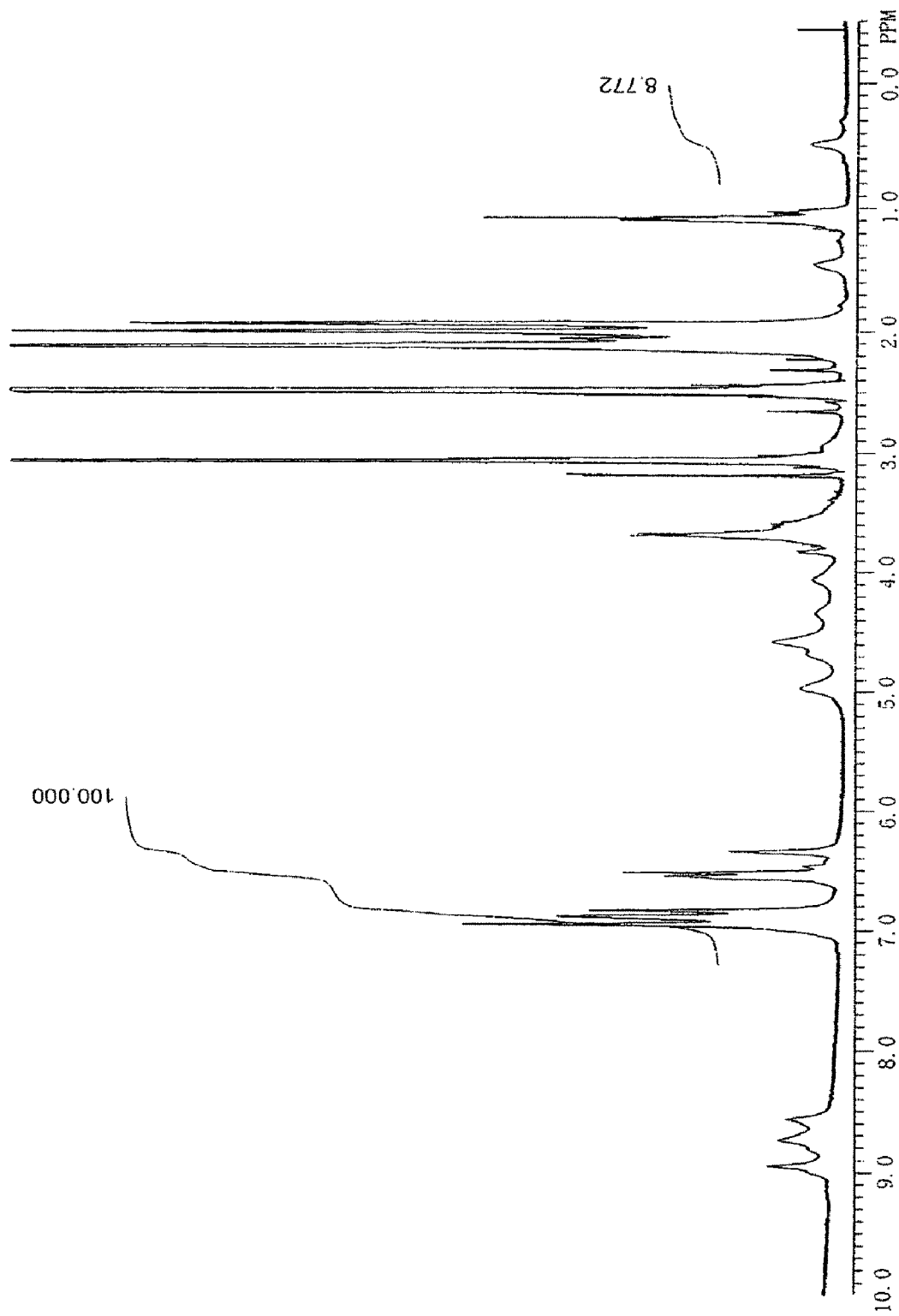
FIG. 4 is a view showing the $^1$H NMR spectrum of cellulose 3,5-dimethylphenylcarbamate containing an alkoxysilyl group obtained in Example 1 in DMSO-$d_6$ at 80° C.

(1-3) Method of Measuring the Ratio of Introduction of the Molecules of 3-isocyanatepropyltriethoxysilane in the Cellulose Derivative The ratio of introduction of silyl groups in the polymer compound derivative was calculated from a ratio between a proton of the phenyl group of a 3,5-dimethylphenyl group of the cellulose derivative into which the silyl groups had been introduced and a methylene proton directly bonded to silicon of a 3-triethoxysilylpropyl group determined from a $^1$H NMR spectrum (400 MHz, Gemini-2000 (manufactured by Varian, Inc.), in DMSO-$d_6$, 80° C.), and was defined as the ratio of introduction of molecules of 3-isocyanatepropyltriethoxysilane in the polymer compound derivative. FIG. 4 shows the $^1$H NMR spectrum of the derivative-B. The $^1$H NMR spectrum shows that a signal derived from the proton of the phenyl group appears at around 6.0 to 7.0 ppm and that a signal derived from the methylene proton bonded to a silyl group appears at around 0.5 ppm. Therefore, the $^1$H NMR results confirmed that the ratio of introduction of the molecules of 3,5-dimethylphenyl isocyanate and the ratio of introduction of the molecules of 3-isocyanatepropyltriethoxysilane are 89.0% and 11.0%, respectively.

(1-4) Preparation of Cellulose Derivative Beads 250 mg of the derivative-B were dissolved in 30 ml of a mixed solvent of tetrahydrofuran and 1-heptanol at a volume ratio of 2:1. The solution was dropped into 500 ml of a 0.2% aqueous solution of sodium lauryl sulfate heated in a water bath at 80° C. while the aqueous solution was stirred with a disperser with the number of revolutions of its shaft set to 1,100 rpm.

Tetrahydrofuran was removed by distillation, and the resultant beads were recovered by suction filtration and washed with water and methanol. After the washing, the beads were dried in a vacuum, whereby 188 mg of beads-B-1 were obtained. Products obtained by repeating the operation were fractionated with a 20 μm filter, whereby beads each having a particle size of about 3 to 10 μm were recovered. A six-blade type disperser shaft and a 1-1 beaker were used in the preparation of the beads.

600 mg of the beads B-1 which had been dried were dispersed in a mixture of ethanol, water, and trimethylchlorosilane (6 ml, 1.5 ml, and 0.4 ml), and the dispersed product was subjected to a reaction for 10 minutes while being boiled in an oil bath at 110° C., whereby the remaining silanol groups were treated. 500 mg of the resultant crosslinked beads were washed with tetrahydrofuran, whereby 0.36 mg of the cellulose derivative was eluted. The foregoing showed that 99% or more of the cellulose derivative was immobilized in the beads. The crosslinked beads after the washing with tetrahydrofuran were defined as beads B-2.

Figure 2:
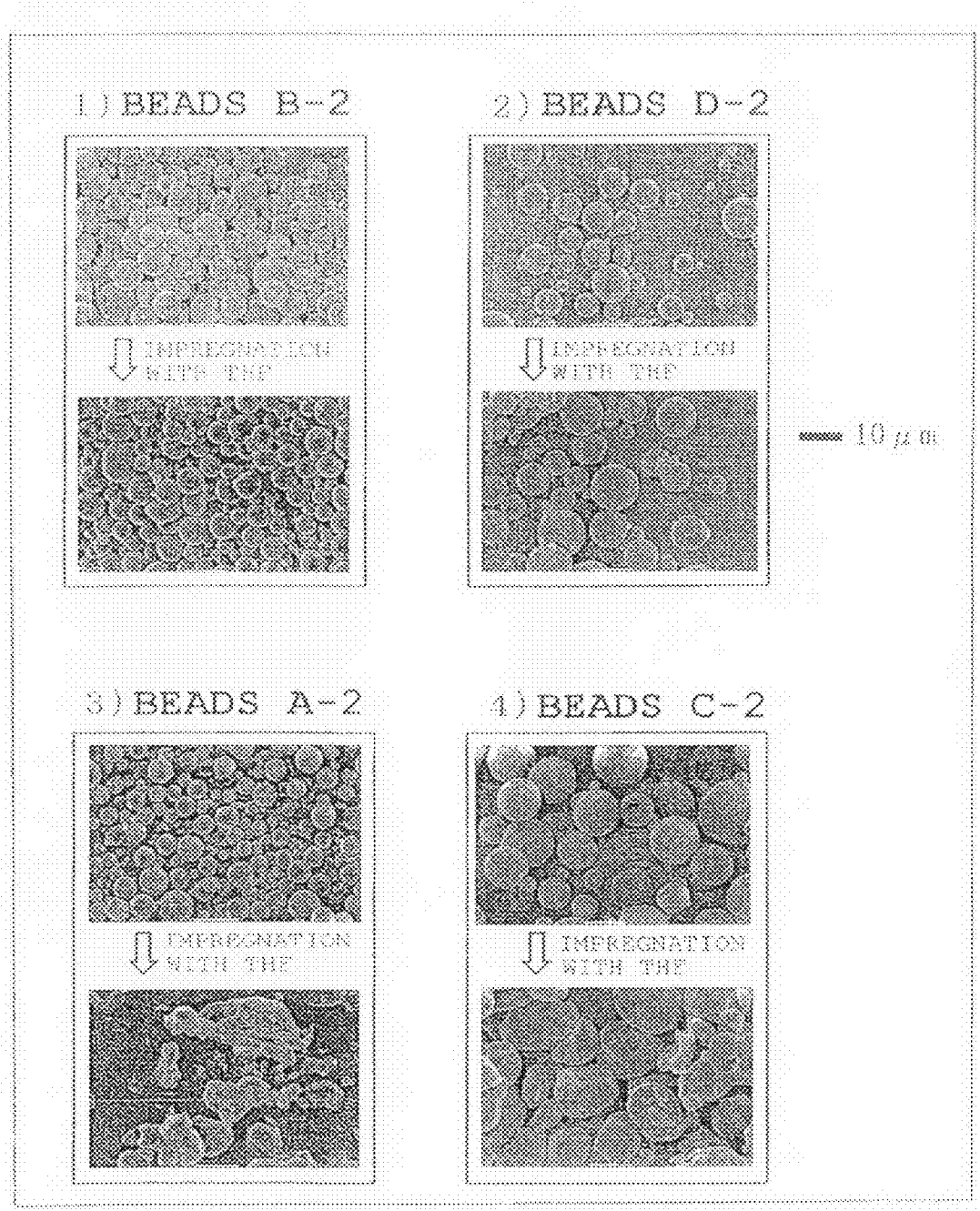
FIG. 2 shows secondary electron images (photographs) of beads obtained in examples and comparative examples provided with a scanning electron microscope.

The resultant beads were observed with a scanning electron microscope (SEM) (JSM-5600 manufactured by JEOL Ltd.). As a result, it was found that none of the sizes and surface states of the beads showed a certain change even after the beads had been impregnated with tetrahydrofuran. FIG. 2 shows the SEM images of the beads B-2 before and after washing with tetrahydrofuran.

(1-5) Loading into a Column

The beads B-2 thus obtained was subjected to particle size fractionation, and was then loaded into a stainless steel column having a length of 25 cm and an inner diameter of 0.2 cm by a slurry method, whereby a column-1 was obtained.

The mass of the beads in the column-1 was 0.28 g, and the column-1 had a number of theoretical plates (N) of 1,200. It should be noted that the deformation or the like of each of the beads due to pressurization at the time of the loading was not found when the beads were observed with an SEM before and after the loading.

(1-6) Evaluation for Optical Resolution

Figure 3:
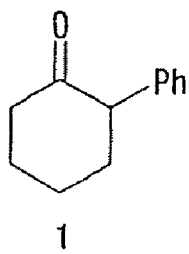
FIG. 3 is a view showing the structural formulae of compounds to be optically resolved in the examples and comparative examples in which numerical values described below the structural formulae correspond to numerical values representing the kinds of racemic bodies described in Table 1.
Figure 3:
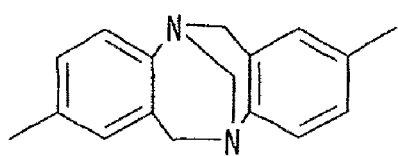
Figure 3:
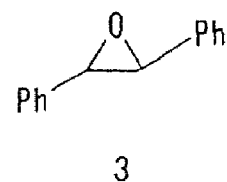
Figure 3:
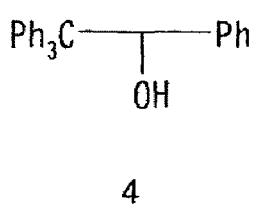
Figure 3:
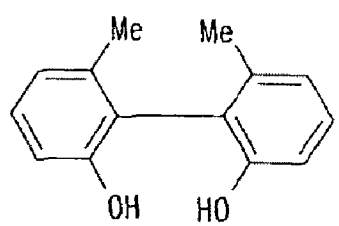
Figure 3:
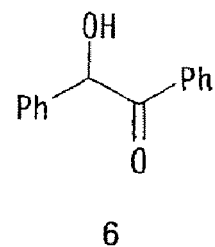
Figure 3:
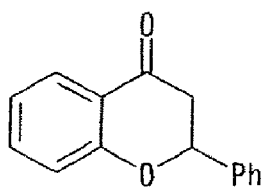
Figure 3:
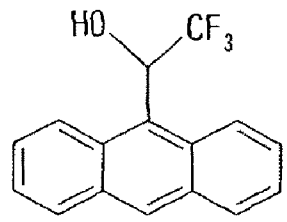
Figure 3:

The optical resolution of ten kinds of racemic bodies (FIG. 3) with the column-1 obtained by the above-mentioned operation (column temperature: about 20° C.) was performed. A HPLC pump (trade name: PU-980) manufactured by JASCO Corporation was used. The detection and identification of a peak were performed with a UV detector (wavelength: 254 nm, trade name: UV-970, manufactured by JASCO Corporation) and an optical rotation detector (trade name: OR-990, manufactured by JASCO Corporation) under the following conditions: a mixture of hexane and 2-propanol at a ratio of 95:5 was used as an eluent, and its flow rate was 0.2 ml/min. It should be noted that the number of theoretical plates N was determined from the peak of benzene, and a time $t_0$ for which the eluent passed through the column was determined from the elution time of 1,3,5-tri-tert-butylbenzene.

It should be noted that conditions concerning, for example, HPLC and a detector used in the evaluation for optical resolution identical to those described above were used in the following examples and comparative examples.

Table 1 shows the results of the optical resolution with the column-1. Values in the table are a capacity ratio k1' and a separation factor α, and a sign in parentheses represents the optical activity of an enantiomer which was previously eluted.

It should be noted that the capacity ratio k1' and the separation factor α are defined by the following formulae. A capacity ratio and a separation factor were calculated in the following examples and comparative examples by using the same formulae.

Capacity ratio k1'

$$k1'=[(\text{retention time of enantiomer})-(t_0)]/t_0 \quad \text{Num 1}$$

Separation factor α

$$\alpha = (\text{capacity ratio of enantiomer to be retained more strongly})/(\text{capacity ratio of enantiomer to be retained more weakly}) \quad \text{Num 2}$$

Example 2

(2-1) Synthesis of Cellulose 3,5-dimethylphenylcarbamate with Hydroxy Groups Remaining at Part of its 6-Positions 300 ml of dehydrated N,N-dimethylacetamide and 18.1 g of lithium chloride were added to 10.0 g (61.8 mmol) of dried cellulose, and the mixture was swollen. After that, the resultant mixture was stirred so that cellulose was uniformly dissolved. 150 ml of pyridine and 5.20 g (18.7 mmol) of trityl chloride were added to the resultant mixture and the mixture was subjected to a reaction at 80° C. for 24 hours. After that, 37.0 g (250 mmol) of 3,5-dimethylphenyl isocyanate were added to the resultant mixture and the mixture was subjected to a reaction at 80° C. for 24 hours. The reaction solution was dropped into methanol and the resultant insoluble matter was stirred in 1,000 ml of a 1% solution of HCl in methanol for 24 hours. Thus, deprotection was performed so that the substituents at 6-positions were returned to hydroxy groups. The resultant product was washed with methanol and then dried in a vacuum, whereby 30.0 g (5.15 mmol) of a cellulose derivative-C with hydroxy groups remaining at part of its 6-positions were obtained.

Figure 5:
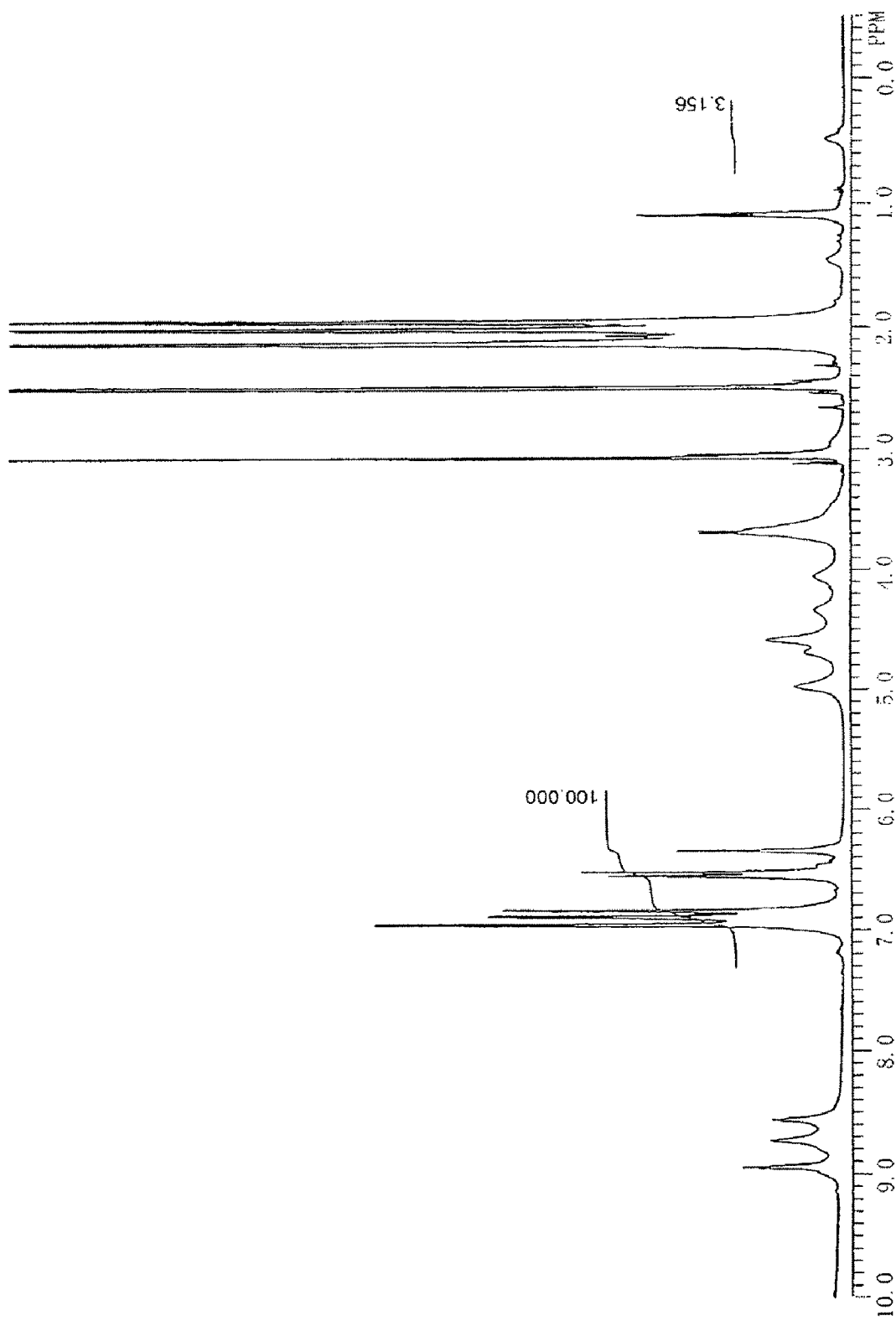
FIG. 5 is a view showing the $^1$H NMR spectrum of cellulose 3,5-dimethylphenylcarbamate containing an alkoxysilyl group obtained in Example 2 in DMSO-$d_6$ at 80° C.

(2-2) Synthesis of Cellulose 3,5-dimethylphenylcarbamate Having Alkoxysilyl Groups 100 ml of pyridine and 4.71 g (19.0 mmol) of 3-isocyanatepropyltriethoxysilane were added to 10.0 g (17.2 mmol) of the derivative-C which had been dried, and the mixture was subjected to a reaction at 85° C. for 24 hours. The pyridine-soluble portion was dropped into methanol and was recovered as an insoluble portion. After that, the recovered portion was dried in a vacuum, whereby 5.18 g of a cellulose 3,5-dimethylphenylcarbamate derivative-D into which alkoxysilyl groups had been introduced were obtained. The results of $^1$H NMR performed by the same procedure as that of Example 1 confirmed that the ratio of introduction of molecules of 3,5-dimethylphenyl isocyanate and the ratio of introduction of molecules of 3-isocyanatepropyltriethoxysilane were 95.3% and 4.7%, respectively (FIG. 5).

(2-3) Preparation of Cellulose Derivative Beads 375 mg of the derivative-D were dissolved in 30 ml of a mixed solvent of tetrahydrofuran and 1-heptanol at a volume ratio of 4:1. The solution was dropped into 500 ml of a 0.2% aqueous solution of sodium lauryl sulfate heated in a water bath at 80° C. while the aqueous solution was stirred with a disperser with the number of revolutions of its shaft set to 1,100 rpm.

Tetrahydrofuran was removed by distillation, and the resultant beads were recovered by suction filtration and washed with water and methanol. After the washing, the beads were dried in a vacuum, whereby 310 mg of beads D-1 were obtained. Products obtained by repeating the operation were fractionated with a 20 μm filter, whereby beads having a particle size of about 3 to 10 μm were recovered. A six-blade type disperser shaft and a 1-1 beaker were used in the preparation of the beads.

The resultant beads were observed with a scanning electron microscope (SEM). As a result, it was found that none of the sizes and surface states of the beads showed a certain change even after the beads had been impregnated with tetrahydrofuran. FIG. 2 shows the SEM images of the beads D-2 before and after washing with tetrahydrofuran.

(2-4) Loading into a Column

The beads D-2 before washing with tetrahydrofuran were subjected to particle size fractionation and then loaded into a stainless steel column having a length of 25 cm and an inner diameter of 0.2 cm by a slurry method, whereby a column-2 was obtained.

The column-2 had a number of theoretical plates (N) of 450.

(2-5) Evaluation for Optical Resolution

The optical resolution of nine kinds of racemic bodies (FIG. 3) with the column-2 obtained by the above-mentioned operation was performed. The detection and identification of a peak were performed with a UV detector and an optical rotation detector under the following conditions: a mixture of hexane and 2-propanol at a ratio of 90:10 was used as an eluent, and its flow rate was 0.2 ml/min. It should be noted that the number of theoretical plates N was determined from the peak of benzene, and a time $t_0$ for which the eluent passed through the column was determined from the elution time of 1,3,5-tri-tert-butylbenzene.

Table 1 shows the results of the optical resolution with the column-2. Values in the table are a capacity ratio k1' and a separation factor α, and a sign in parentheses represents the optical activity of an enantiomer which was previously eluted.

Comparative Example 1

Synthesis of Cellulose 3,5-dimethylphenylcarbamate Having Alkoxysilyl Groups

The synthesis was performed as follows with reference to Non-patent document 1.

Figure 6:
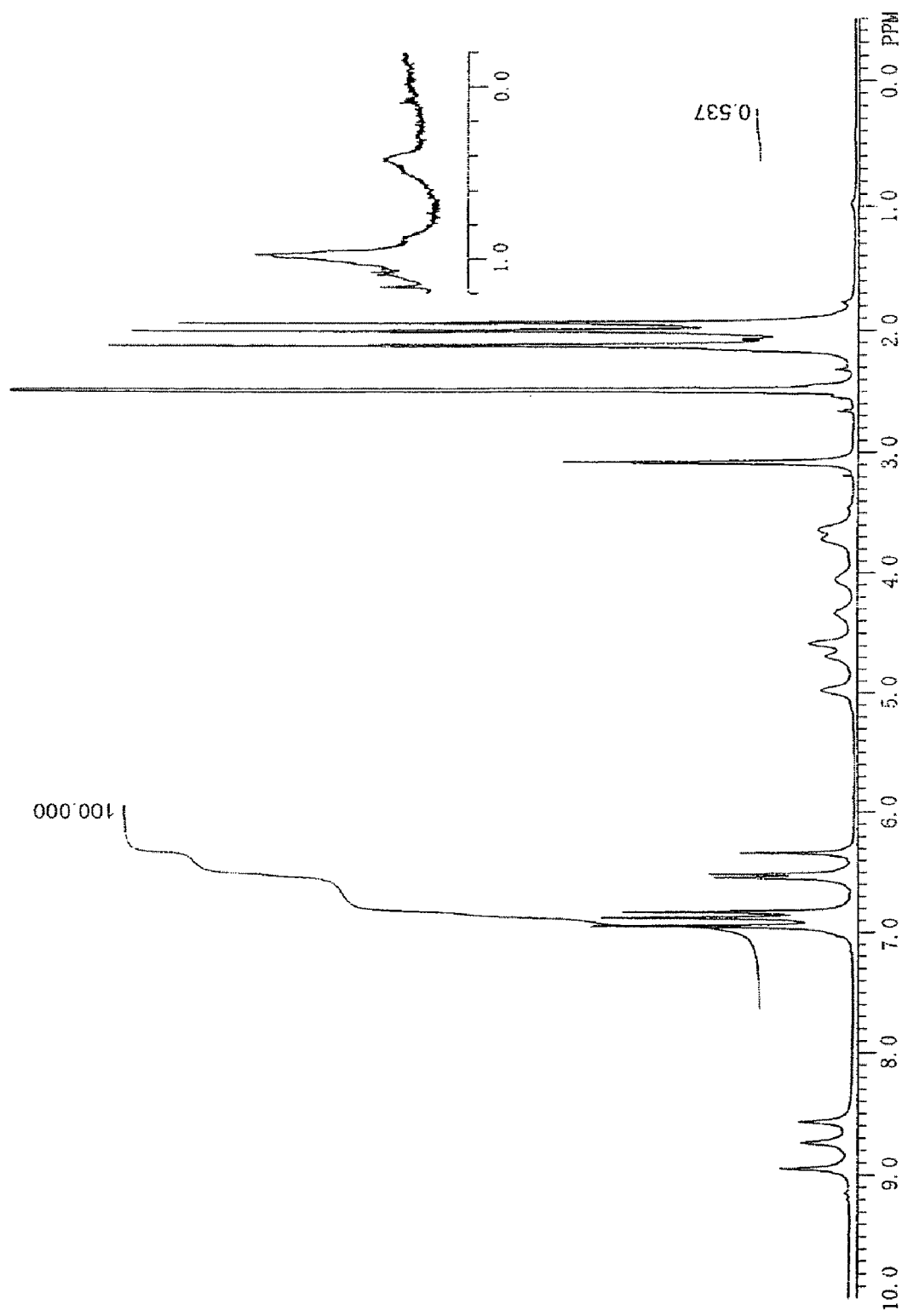
FIG. 6 is a view showing the $^1$H NMR spectrum of cellulose 3,5-dimethylphenylcarbamate obtained in Comparative Example 1 in DMSO-$d_6$ at 80° C.

90 ml of dehydrated pyridine were added to 2.40 g (14.8 mmol) of dried cellulose. Further, 9.0 ml (58.5 mmol) of 3,5-dimethylphenyl isocyanate and 0.9 ml (3.68 mmol) of 3-isocyanatepropyltriethoxysilane were added to the mixture, and the whole was subjected to a reaction at 90° C. for 10 hours. The above-mentioned reaction system was always non-uniform, and turned into a highly viscous solution after a lapse of 10 hours. The reaction solution was dropped into methanol and recovered as an insoluble portion. After that, the recovered portion was dried in a vacuum, whereby 6.30 g of a derivative-E were obtained. However, most (about 62%) of the derivative-E was a gel insoluble in THF. $^1$H NMR analysis of the THF soluble portion of the derivative-E confirmed that the ratio of introduction of molecules of 3,5-dimethylphenyl isocyanate and the ratio of introduction of 3-isocyanatepropyltriethoxysilane were 99.3% and 0.7%, respectively. That is, nearly no 3-isocyanatepropyltriethoxysilane could be introduced (FIG. 6). In addition, it was extremely difficult to separate the THF-soluble portion and the THF-insoluble portion from each other completely, so a pure derivative could not be isolated.

Comparative Example 2

(2-1) Preparation of Cellulose Derivative Beads Having No Alkoxysilyl Group 375 mg of the derivative-A obtained in Example 1 were dissolved in 45 ml of a mixed solvent of tetrahydrofuran and 1-heptanol at a volume ratio of 2:1. The solution was dropped into 500 ml of a 0.2% aqueous solution of sodium lauryl sulfate heated in a water bath at 80° C. while the aqueous solution was stirred with a disperser with the number of revolutions of its shaft set to 1,100 rpm. Tetrahydrofuran was removed by distillation, and the resultant beads were recovered by suction filtration and washed with water and methanol. After the washing, the beads were dried in a vacuum, whereby 335 mg of beads A-1 were obtained. Products obtained by repeating the operation were fractionated with a 20 μm filter, whereby beads having a particle size of about 3 to 10 μm were recovered. A six-blade type disperser shaft and a 1-1 beaker were used in the preparation of the beads.

(2-2) Crosslinking of the Beads with a Diisocyanate

Under a nitrogen atmosphere, 6 ml of toluene and 44 mg (0.18 mmol) of 4,4'-diphenylmethane diisocyanate were added to 600 mg (1.08 mmol) of the beads A-1 which had been dried, and the mixture was subjected to a reaction at 80° C. for 36 hours. After that, 730 mg (4.96 mmol) of 3,5-dimethylphenyl isocyanate were added to the resultant mixture and the mixture was subjected to a reaction at 80° C. for 33 hours. Further, 3 ml of tert-butyl alcohol were added to the resultant mixture and the mixture was stirred for 9 hours. The IR of the supernatant liquid was measured so that the absence of the isocyanates was confirmed. After that, the beads were recovered by filtration. The resultant beads were washed with warmed methanol in order that urea produced from the isocyanates and tert-butyl alcohol might be removed. After the washing, the beads were dried in a vacuum, whereby 592 mg of beads A-2 were obtained.

The resultant beads were observed with a scanning electron microscope (SEM). As a result, it was found that the beads could not maintain their shapes after washing with tetrahydrofuran. In view of the foregoing, the beads before the washing with tetrahydrofuran were used as a filler in each of Comparative Example 2-3 described below. FIG. 2 shows the SEM images of the beads A-2 before and after the washing with tetrahydrofuran.

(2-3) Loading of the Beads into a Column

The beads A-2 before washing with tetrahydrofuran was subjected to particle size fractionation, and was then loaded into a stainless steel column having a length of 25 cm and an inner diameter of 0.2 cm by a slurry method, whereby a column-3 was obtained.

The column-3 had a number of theoretical plates (N) of 1,100.

(2-4) Evaluation for Optical Resolution

The optical resolution of ten kinds of racemic bodies (FIG. 3) with the column-3 obtained by the above-mentioned operation were performed. The detection and identification of a peak were performed with a UV detector and an optical rotation detector under the following conditions: a mixture of hexane and 2-propanol at a ratio of 95:5 was used as an eluent, and its flow rate was 0.2 ml/min. It should be noted that the number of theoretical plates N was determined from the peak of benzene, and a time $t_0$ for which the eluent passed through the column was determined from the elution time of 1,3,5-tri-tert-butylbenzene.

Table 1 shows the results of the optical resolution with the column-3.

Comparative Example 3

(3-1) Preparation of Cellulose Derivative Beads Having No Alkoxysilyl Group 750 mg of the derivative-C obtained in Example 2 were dissolved in 45 ml of a mixed solvent of tetrahydrofuran and 1-heptanol at a volume ratio of 4:1. The solution was dropped into 500 ml of a 0.2% aqueous solution of sodium lauryl sulfate heated in a water bath at 80° C. while the aqueous solution was stirred with a disperser with the number of revolutions of its shaft set to 1,100 rpm. Even after the dropping, the temperature was kept at 80° C., tetrahydrofuran was removed by distillation, and the resultant beads were recovered by suction filtration and washed with water and methanol. After the washing, the beads were dried in a vacuum, whereby beads C-1 were obtained. Products obtained by repeating the operation were fractionated with a 20 μm filter, whereby beads having a particle size of about 3 to 10 μm were recovered. A six-blade type disperser shaft and a 1-1 beaker were used in the preparation of the beads.

(3-2) Crosslinking of the Beads with a Diisocyanate

Under a nitrogen atmosphere, 21 ml of toluene and 175 mg (0.66 mmol) of 4,4'-dibenzyl diisocyanate were added to 2.10 g (3.61 mmol) of the beads C-1 which had been dried, and the mixture was subjected to a reaction at 80° C. for 36 hours. After that, 730 mg (4.96 mmol) of 3,5-dimethylphenyl isocyanate were added to the resultant mixture and the mixture was subjected to a reaction at 80° C. for 24 hours. One half of the reaction solution was extracted from the reaction system and recovered by filtration. In this case, the recovered solution was washed with warmed methanol while being sucked in order that urea produced from excess isocyanates and methanol might be removed. After the washing, the resultant product was dried in a vacuum, whereby 1.18 g of beads C-2 were obtained.

The resultant beads were observed with a scanning electron microscope (SEM). As a result, it was found that the beads could not maintain their shapes after washing with tetrahydrofuran. In view of the foregoing, the beads before the washing with tetrahydrofuran were used as a filler in each of Comparative Example 3-3 described below. FIG. 2 shows the SEM images of the beads C-2 before and after the washing with tetrahydrofuran.

(3-3) Loading of the Beads into a Column

The beads C-2 before washing with tetrahydrofuran were subjected to particle size fractionation and then loaded into a stainless steel column having a length of 25 cm and an inner diameter of 0.2 cm by a slurry method, whereby a column-4 was obtained.

The column-4 had a number of theoretical plates (N) of 580.

(3-4) Evaluation for Optical Resolution

The optical resolution of nine kinds of racemic bodies (FIG. 3) with the column-4 obtained by the above-mentioned operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 1 shows the results of the optical resolution with the column-4.

Table 1

TABLE 1

Optical resolutions of columns 1 to 4

| Racemates | Column-1[a] | | Column-2[b] | | Column-3[a] | | Column-4[b] | |
|---|---|---|---|---|---|---|---|---|
| | k1' | α | k1' | α | k1' | α | k1' | α |
| 1 | 7.61(−) | 1.30 | 5.97(−) | 1.23 | 6.02(−) | 1.23 | 4.30(−) | 1.21 |
| 2 | 5.42(+) | 1.58 | 5.13(+) | 1.37 | 6.02(+) | 1.09 | 3.69(+) | 1.26 |
| 3 | 4.01(−) | 1.17 | 3.49(−) | 1.76 | 3.34(−) | 1.99 | 2.63(−) | 1.74 |
| 4 | 11.49(+) | 1.20 | — | | 9.48(+) | 1.19 | 5.63(+) | 1.19 |
| 5 | 16.40(−) | 3.90 | 7.96(−) | 3.22 | 13.08(−) | 2.80 | 5.38(−) | 2.89 |
| 6 | 21.19(+) | 1.26 | 13.59(+) | 1.37 | 16.15(+) | 1.43 | 9.08(+) | 1.38 |
| 7 | 9.26(−) | 1.13 | 7.44(−) | 1.26 | 7.83(−) | 1.29 | 5.57(−) | 1.23 |
| 8 | 5.10(+) | 1.26 | 2.35(+) | 1.27 | 4.01(+) | 1.27 | — | |
| 9 | 20.00(−) | 2.20 | 10.84(−) | 2.50 | 24.13(−) | 3.16 | 7.69(−) | 2.57 |
| 10 | 20.75 | 1.00 | 6.63(+) | 1.52 | 10.01(+) | 1.91 | 4.12(+) | 1.83 |

[a]Eluent: hexane/2-propanol (95/5)
[b]Eluent: hexane/2-propanol (90/10)
Column: 25 × 0.20 cm (i.d.), Flow rate: 0.2 ml/min The present application has been made to claim priority based on Japanese Patent Application No. 2006-130194 filed on the ninth day of May, 2006, and the above-mentioned patent application is incorporated herein by reference.

The invention claimed is:

1. A method of producing beads used in the separation of optical isomers, comprising the steps of:
   modifying some of the hydroxy or amino groups of a polysaccharide having hydroxy or amino groups with molecules of a compound represented by formula (I)

$$A\text{-}X\text{—}Si(Y)_n R_{3-n} \quad (I)$$

where A is a chlorocarbonyl group, a carboxyl group, an isocyanate group, a glycidyl group or a thiocyanate group, X is an alkylene group, which may be branched, having from 1-18 carbon atoms or an arylene group which may have a substituent, Y is an alkoxy group having 1-12 carbon atoms or a halogen group, R is an alkyl group, which may be branched, having 1-18 carbon atoms or an aryl group which may have a substituent and n is an integer of 1-3, to form a polysaccharide derivative;
   dissolving the polysaccharide derivative in an organic solvent to prepare a polysaccharide derivative solution; and
   adding the polysaccharide derivative solution to an aqueous solution of a surfactant or proton-donating solvent while stirring the aqueous solution or solvent to cross-link the polysaccharide derivative and forming the beads;
   wherein a ratio of introduction of the molecules of the compound of formula (I) into the hydroxy or amino groups of the polysaccharide is from 1.0-35%.

2. The method of producing beads according to claim 1, wherein the polysaccharide is cellulose or amylose.

3. The method of producing beads according to claim 1, wherein the compound represented by formula (I) comprises 3-isocyanate propyl triethoxysilane, 3-isocyanate propyl trimethoxysilane, 3-isocyanate propyl diethoxymethylsilane, 2-isocyanate ethyl triethoxysilane, 4-isocyanate phenyl triethoxysilane, 3-glycidoxy propyl trimethoxysilane, 3-glycidoxy propyl triethoxysilane, or 3-thiocyanatepropyl triethoxysilane.

4. The method of producing beads according to claim 1, wherein at least some of the hydroxy or amino groups, other than the hydroxy or amino groups modified with the molecules of the compound of formula (I), are further modified with molecules of a compound having a functional group which acts on an optical isomer.

5. The method of producing beads according to claim 4, wherein the molecules of the compound having a functional group which acts on an optical isomer are introduced into some of the hydroxy or amino groups, other than the hydroxy or amino groups modified with the molecules of the compound of formula (I) through a urethane bond, a urea bond, an ester bond, or an ether bond.

6. The method of producing beads according to claim 4, wherein the compound having a functional group which acts on an optical isomer comprises a compound containing an atomic group represented by the following formula (II) or (III):

$$\text{—CO—R'} \quad (II)$$

$$\text{—CO—NH—R'} \quad (III)$$

where R' represents an aliphatic or aromatic hydrocarbon group which may contain a heteroatom and unsubstituted or substituted with one or more groups selected from the group consisting of a hydrocarbon group which has 1 to 12 carbon atoms and which may contain a heteroatom, a cyano group, a halogen group, a hydroxy group, a nitro group, an amino group and a dialkylamino group containing two alkyl groups, each having 1 to 8 carbon atoms.

7. The method of producing beads according to claim 6, wherein the compound having a functional group which acts on an optical isomer comprises 3,5-dimethylphenyl isocyanate.

* * * * *